Figure 1:
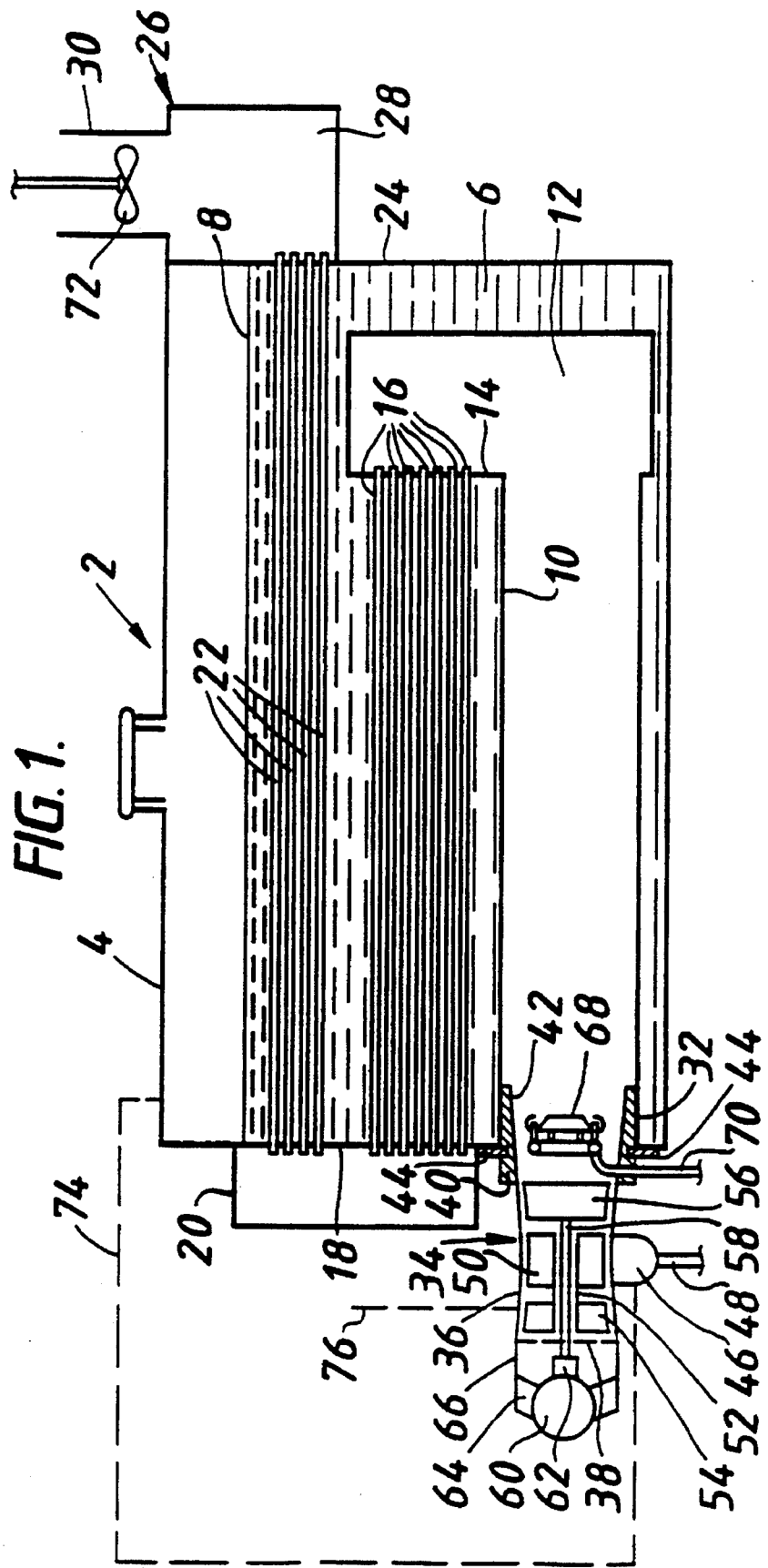

United States Patent

Sutton et al.

[11] Patent Number: 5,473,884
[45] Date of Patent: Dec. 12, 1995

[54] COMBINED HEAT AND POWER APPARATUS

[75] Inventors: Jeffrey A. Sutton, Solihull; Alan Greenhalgh, Bolton, both of United Kingdom

[73] Assignee: British Gas plc, London, England

[21] Appl. No.: 284,650

[22] PCT Filed: Dec. 9, 1993

[86] PCT No.: PCT/GB93/02517

§ 371 Date: Aug. 11, 1994

§ 102(e) Date: Aug. 11, 1994

[87] PCT Pub. No.: WO94/14000

PCT Pub. Date: Jun. 23, 1994

[30] Foreign Application Priority Data

Dec. 11, 1992 [GB] United Kingdom ............... 9225949

[51] Int. Cl.$^6$ .................................. F22B 7/00
[52] U.S. Cl. .................... 60/39.182; 60/39.41
[58] Field of Search ............... 60/39.07, 39.181, 60/39.182, 39.41

[56] References Cited

FOREIGN PATENT DOCUMENTS

| 1353016 | 5/1974 | United Kingdom . |
| 1355952 | 6/1974 | United Kingdom . |
| 1531507 | 11/1978 | United Kingdom . |
| 1537234 | 12/1978 | United Kingdom . |

Primary Examiner—Timothy S. Thorpe
Attorney, Agent, or Firm—Larson and Taylor

[57] ABSTRACT

A shell steam boiler 2 comprises a furnace tube 10 having an entrance 32 which contains a gas burner 68 and also receives the hot exhaust gases from a small gas turbine 34 giving an output, on a power take off shaft 58 from a power turbine 56, of 0.5 MW or less which drives an electrical power generator 60. Hot heating gases from the gas turbine 34 and the burner 68 pass down the furnace tube 10 and then through a first group of pass tubes 16 and then through a second group of pass tubes 22 to an enclosure 26 comprising a flue 30. A driven fan 72 in the enclosure 26 acts to draw the heating gases through the boiler and promotes a good flow of those gases.

15 Claims, 2 Drawing Sheets

COMBINED HEAT AND POWER APPARATUS

This invention concerns a combined heat and power apparatus, and more particularly such an apparatus in which part of the heat needed is provided by hot exhaust gases emerging from a small gas turbine.

According to the invention a combined heat and power apparatus comprises a gas turbine driving electrical power generating means, a boiler comprising heating gases passage means to receive and convey hot heating gases therethrough whereby heat exchange takes place between said heating gases and water in the boiler to raise the temperature of said water, characterised in that the gas turbine has a power output which does not exceed 0.5 Megawatts, said gas turbine is mounted on said boiler at an inlet end of said passage means so that hot products of combustion constituting exhaust gases from the gas turbine are fed substantially directly from a gas turbine exhaust gas outlet end into said inlet end of said heating gases passage means so that heating gases comprise at least in part said exhaust gases when the gas turbine is operating, fuel gas burner means is disposed in said heating gases passage means at or adjacent to said inlet end thereof, and exhaust means is provided to create a pressure drop along said heating gases passage means towards an outlet end of said heating gases passage means to draw the heating gases towards the outlet end of the heating gases passage means.

The boiler can be a steam boiler for raising steam, or the boiler may be simply a hot water boiler to produce hot water.

The gas turbine and the burner means each have a respective maximum heat energy output, and the maximum heat energy output of the burner means can be greater than the maximum heat energy output of the gas turbine.

The boiler may be a shell boiler having a shell or casing which acts as a tank for water to be heated and contains said heating gases passage means. The boiler may comprise a front plate, and the gas turbine may be mounted on said front plate.

The gas turbine may be operational so that its power output can be selectively varied between a maximum and a minimum, and the burner means may be provided with fuel gas supply means by which the supply of fuel gas to the burner means can be selectively varied between zero and a maximum.

Figure 2:
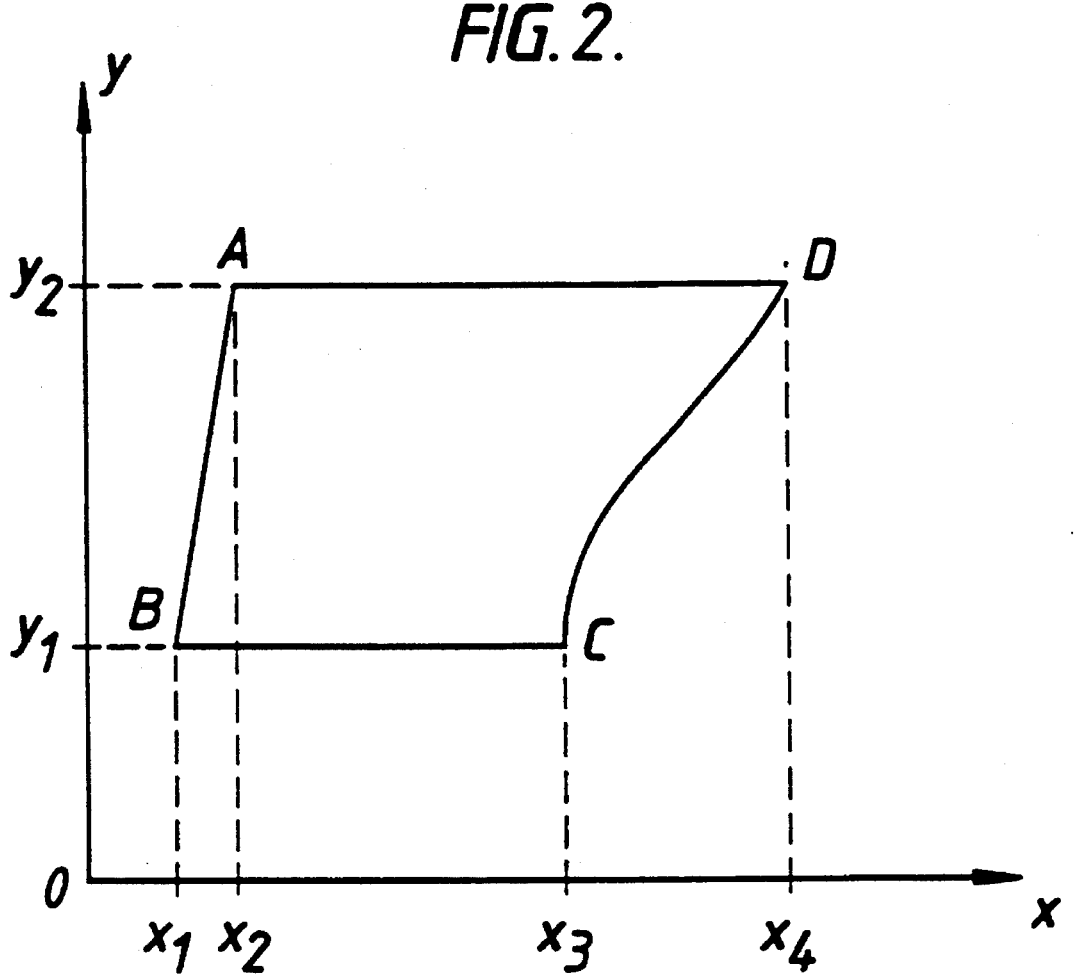

The invention will now be further described, by way of example, with reference to the accompanying drawings in which:

FIG. 1 shows diagramatically, in section, an embodiment of an apparatus formed according to the invention, and FIG. 2 is a graphic representation showing an envelope of operation of apparatus formed according to the invention, in terms of variation in power output of the gas turbine plotted against variation in heat input to the boiler.

With reference to FIG. 1 a shell boiler 2 intended for raising steam has an outer shell or casing 4 which acts as a tank for water 6 which comes up to water level 8. The boiler 2 comprises an horizontal furnace tube 10. A rear end of the furnace tube 10 opens into a compartment or combustion chamber 12 having a front wall 14 supporting a set of rear ends of a plurality of horizontal pass tubes 16 opening into the combustion chamber 12. Front ends of the tubes 16 are supported by a front tube plate 18, forming a front plate or wall of the casing 4, on which front tube plate is mounted a compartment or transfer box 20 into which the front ends of the tubes 16 open. Another plurality of horizontal pass tubes 22 has a front set of ends opening into the transfer box 20 and supported by the front tube plate 18 and has a rear set of ends supported by a rear wall plate 24 of the casing 4. Those rear ends of the tubes 22 open into an enclosure 26 mounted on the casing 4. Thus there is a first group of pass tubes 16 and a second group of pass tubes 22, and each pass tube has an internal diameter (or cross-sectional area) which is much less than the internal diameter (or cross-sectional area) of the furnace tube 10. The enclosure 26 comprises a smoke box 28 and a stack or flue 30. At front end 32 the furnace tube 10 is open and coincides with an opening in the front tube plate 18 on which the furnace tube is mounted.

A gas turbine is indicated at 34. It has an outer casing 36 terminating at a front or air inlet end indicated by interrupted line 38. The casing 36 terminates at its rear end as a quarl 40 of refractory material defining a frusto-conical throat 42 fitted into the front end of the furnace tube 10. One or more mounting plates 44 provided on the turbine casing 36 or quarl provide means whereby the gas turbine can be secured to the front tube plate 18. This permits, if desired, the boiler 2 to support the gas turbine 34 in cantilever fashion, and for that reason the gas turbine is preferably a lightweight gas turbine.

The gas turbine 34 can be of any suitable known kind. It is small and has a power output which does not exceed 0.5 MW and can be less. In this example the gas turbine 34 comprises a combustor 46 supplied with fuel gas, for example natural gas, via supply pipe 48, and a combustor turbine 50 mounted fast with a quill shaft 52 to drive a compressor 54. After driving the turbine 50 hot gases drive a power turbine 56 and emerge as hot products of combustion or exhaust gases substantially immediately into the furnace tube 10 via quarl throat 42. The power turbine 56 drives a shaft 58 which drives an electrical power generator 60 via a gearbox 62 to give an electrical power output which may be about 0.5 MW or less. This electrical power may be used to supplement a mains supply or as an alternative to the mains supply.

To support the generator 60 it may be mounted on spaced struts 64 carried by arms 66 extending from the turbine casing 36.

A gas burner 68 is mounted in the quarl throat 42 at the inlet end of the furnace tube 10 and is supplied with fuel gas, for example natural, gas by a fuel pipe 70.

Hot products of combustion from the gas turbine 34 and the burner 68 make a first pass through the boiler 2 as heating gases along the furnace tube 10, then make a second pass along the pass tubes 16 to the transfer box 20, and finally a third pass along the pass tubes 22 to the smoke box 28 from which the gases leave via the flue.

A driven induction fan 72, which may be heat resistant, is provided in the enclosure 26 to create a pressure drop between the quarl throat 42 and the enclosure 26 to induce a good flow of heating gases through the boiler. When the gas turbine 34 is operating, whether or not the burner 68 is firing, the good flow of heating gases is desirable to ensure that the gas turbine is running properly. When the burner 68 is firing, whether or not the gas turbine 54 is operating, the fan 72 should be operated to ensure the desired good flow of heating gases through the boiler to achieve adequate heat exchange. The speed of rotation of the fan 72 can be selectively varied according to the flow resistance that the boiler exhibits to the heating gases to ensure the required good flow thereof.

If one does not wish to generate electricity, then the boiler 2 can be heated to raise steam using only the burner 68. On the other hand if one wishes to raise steam in a minimum period of time (or maintain a supply of steam) and also generate electricity, the boiler can be heated by using the burner 68 and running the gas turbine 34 simultaneously. Should there be little demand for steam, but electricity is required, the boiler can be heated using only the gas turbine exhaust gases.

If desired, some of the steam generated in the boiler 2 can be bled off as indicated by interrupted line 74 and fed to the combustor 46 to increase the power output of the gas turbine 34.

The gas turbine has a compressor stage comprising the compressor 54. If desired a supply of compressed air may be taken from the compressor stage as indicated by the interrupted line 76 for needs other than those of the gas turbine 34.

It is possible to take an existing shell boiler 2 and replace its existing means of heating at the entrance to the furnace tube 10 by the gas turbine 34 and burner 68 heating system disclosed herein and add the fan 72.

Gas turbines use a very high air to fuel gas ratio and the exhaust gases contain a large amount of air and thus oxygen which is available to support combustion of the fuel gas at the burner 68.

The temperature of the exhaust gases leaving the gas turbine 34 may be about 600° C. The maximum amount of heat energy supplied by the burner 68 may be greater than the maximum amount of heat energy supplied by the exhaust gases. For example, the maximum amount of heat energy supplied by the burner 68 may be at least twice the maximum amount of heat energy supplied by the exhaust gases from the gas turbine 34.

FIG. 2 shows a possible operational envelope represented by the figure ABCD plotted on the axis system in which the abscissa x is heat input in kW to the boiler 2 and the ordinate y is the power output in kW of the gas turbine 34. At point A its co-ordinates are $x_2$ and $y_2$. The co-ordinate $y_2$ is the maximum power output that the turbine 34 can produce and $x_2$ is the maximum amount of heat that the turbine can input to the boiler 2 in the form of hot exhaust gases from the turbine. To input more heat into the boiler 2 the burner 68 must be fired. The amount of gas supplied by pipe 70 may be selectively varied between zero and a maximum. That maximum may be determined by the amount of oxygen available in the turbine exhaust gases (when the turbine 36 is operating to give its maximum power output) to support a complete combustion of the fuel gas from the burner 68. Thus with the turbine 36 giving its maximum power output and the fuel gas from the burner 68 giving out the maximum amount of heat that the available combustion oxygen will permit the heat input to the boiler 2 has increased for $x_2$ to $x_4$, where $x_4$ is one of the co-ordinates of point D, the other co-ordinate being $y_2$.

The operation of the turbine 34 can be controllable so that its power output may be selectively varied between the maximum $y_2$ and a minimum $y_1$ which may be about 40% of $y_2$, i.e. $y_1$= substantially $0.4y_2$. When the turbine 36 is giving a power output of $y_1$ its heat input to the boiler 2 is only $x_1$ which is less than $x_2$. In FIG. 2 point B has the co-ordinates $x_1,y_1$. Thus there will be a reduction of steam output when going from turbine operation at point A to operation at point B unless the burner 68 is fired. But because the mass air-flow through the turbine 36 is less when it is operating to give less than its maximum power output there is a reduced amount of oxygen available for the complete combustion of the fuel gas from the burner 68. The fuel gas supply to the burner 68 can be increased from zero up to a value which uses up all the oxygen available for combustion so that the heat input to the boiler 2 increases to $x_3$. This with $y_1$ is a co-ordinate of point C on the envelope. The maximum heat input to the boiler 2 is $x_3$ when the turbine 36 is giving a power output of $y_1$. Heat input $x_3$ is less than $x_4$, increasing the fuel gas supply to the burner 68 beyond the value giving the heat input $x_3$ is wasteful as there is not the oxygen available to allow the combustion of that additional fuel gas.

The figure ABCD defines the boundary of an envelope within which the apparatus can be operated by varying the power output from the turbine 36 between maximum and minimum values $y_1$ and $y_2$ and by varying the fuel gas supply to the burner 68 between zero and value greater than zero to vary the total heat input to the boiler 2 between $x_1$ and $x_4$.

If desired the boiler 2 may be merely a hot water boiler intended simply to give a supply of hot water, in which case the boiler can be completely filled with water. In this case line 74 is omitted.

EXAMPLE 1

At full power output a gas turbine 34 giving an output of the order 150 kW to drive electrical generator 60 giving an electrical output of about 150 kW may be considered as a device which passes a constant air mass flow of substantially 0.907 kg/second (2 lbs/second) and has a temperature of substantially 930° C. (about 1200° K.) at the inlet to the power turbine 56. Assuming a 20% excess of air above the stoichiometric proportion of air needed to completely burn natural gas, then air supplied at 0.907 kg./second will burn enough gas to give a heat output of about 2435 kW. Taking the gas turbine efficiency as 18.9% on a higher (gross) heating value means that the thermal input to the gas turbine must be about 791 kW. This is because the turbine is about 150 kW which is the product of 18.9/100×791.

The subtraction (2435–791) gives 1644 kW, which is the desired thermal output of the burner 68.

If the temperature of the boiler flue is taken as typically about 180° C. and the excess air level is about 20%, then the flue heat energy loss will be about 17.8%. There is also a boiler casing loss of about 1.5% (of maximum boiler rating) giving a total loss of about 19.3% (gross basis) so that the total useful heat to heat water in the boiler is $$2435 \times \frac{(100-19.3)}{100} = \text{about 1965 kW}$$

This is nearly 2 MW.

Boiler sizes are expressed in terms of output so that a boiler 2 with an air throughput of substantially 0.907 kg/second would be rated about 2 MW. When the gas turbine is driving the electrical generator 60 about 150 kW of the available energy appears in the form of electrical power. Thus the amount of energy used to heat water in the boiler is reduced by 150 kW which reduces the boiler output rating by about 8% from 1965 to 1815 kW.

EXAMPLE 2

Using the numerical values of EXAMPLE 1 then the operation parameters in FIG. 2 may be as follows:

$y_1$ is substantially 60 kW, $y_2$ is substantially 150 kW, $x_1$ is substantially 240 kW, $x_2$ is substantially 385 kW, $x_3$ is substantially 1240 kW, and $x_4$ is substantially 1815 kW.

We claim:

1. A combined heat and power apparatus comprising a gas turbine (34) driving electrical power generating means (60), a boiler (2) comprising heating gases passage means (10, 16,22) to receive and convey hot heating gases therethrough whereby heat exchange takes place between said heating gases and water (6) in the boiler (2) to raise the temperature of said water, characterised in that the gas turbine (34) has a power output which does not exceed 0.5 Megawatts, said gas turbine (34) is mounted on said boiler (2) at an inlet end (32) to said heating gases passage means (10,16,22) so that hot products of combustion constituting exhaust gases from the gas turbine (34) are fed substantially directly from a gas turbine exhaust gas outlet end (40) into said inlet end (32) of said heating gases passage means (10,16,22) so that heating gases comprise at least in part said exhaust gases when the gas turbine (34) is operating, fuel gas burner means (68) is disposed in said heating gases passage means (10,16,22) at or adjacent to said inlet end (32) thereof, and exhaust means (26,72) is provided to create a pressure drop along said heating gases passage means (10,16,22) towards an outlet end (28) of said heating gases passage means (10,16,22) to draw the heating gases towards the outlet end (28) of the heating gases passage means.

2. Apparatus as claimed in claim 1, characterised in that the gas turbine (34) and the burner means (68) each have a respective maximum heat energy output, and the maximum heat energy output of the burner means (68) is greater than the maximum heat energy output of the gas turbine (34).

3. Apparatus as claimed in claim 2, characterised in that the maximum heat energy output of the burner means (68) is more than twice the heat energy output of the gas turbine (34).

4. Apparatus as claimed in claim 1, characterised in that the exhaust means comprises a rotatably driven fan (72).

5. Apparatus as claimed in claim 1, characterised in that the boiler is a shell boiler (2) having a shell or casing (4) which acts as a tank for water (6) to be heated and contains said heating gases passage means (10,16,22) arranged for submergence in said water.

6. Apparatus as claimed in claim 5, characterised in that the heating gases passage means comprises a furnace tube (10) and a plurality of pass tubes (16,22) to receive heating gases from the furnace tube (10) and convey them along a path to a heating gases outlet (30), and the furnace tube has an inlet end (30) at which said gas turbine (34) and said burner means (68) are disposed.

7. Apparatus as claimed in claim 6, characterised in that said boiler comprises a front plate (18), and the gas turbine (34) is mounted on said front plate (18).

8. Apparatus as claimed in claim 1, characterised in that the gas turbine (34) and electrical power generating means (60) are mounted in cantilever fashion on said boiler (2).

9. Apparatus as claimed in claim 4, characterised in that the fan (72) is mounted in an enclosure (26) into which at least some of the said pass tubes (22) open.

10. Apparatus as claimed in claim 1, characterised in that said gas turbine (34) has an exhaust gas outlet end comprising a quarl (40) of refractory material disposed at the inlet end (32) to said heating passage means (10,16,22), and said burner means (68) is disposed in said quarl.

11. Apparatus as claimed in claim 1, characterised in that the gas turbine (34) has a combustion air compressor stage (54) provided with means (76) allowing a supply of compressed air to be taken from the compressor stage for needs other than those of the gas turbine.

12. Apparatus as claimed in claim 1, characterised in that the gas turbine (34) can be operated so that its power output can be selectively varied between a maximum and a minimum, and the burner means (68) is provided with fuel gas supply means (70) by which the supply of fuel gas to the burner means (68) can be selectively varied between zero and a maximum.

13. Apparatus as claimed in claim 1, characterised in that the boiler is a steam boiler (2).

14. Apparatus as claimed in claim 13, in which steam from said boiler (2) is supplied (74) to a combustor (46) of the turbine (34).

15. Apparatus as claimed in claim 1, characterised in that the boiler is a hot water boiler (2).

* * * * *